No. 684,863. Patented Oct. 22, 1901.
W. H. PORTER.
CATALYTIC LIGHTING OF ILLUMINATING GAS.
(Application filed May 28, 1896.)

(No Model.)

Witnesses

Inventor
Wm. H. Porter
By Foster Freeman
Attorneys

UNITED STATES PATENT OFFICE.

WILLIAM H. PORTER, OF NEW YORK, N. Y.

CATALYTIC LIGHTING OF ILLUMINATING-GAS.

SPECIFICATION forming part of Letters Patent No. 684,863, dated October 22, 1901.

Application filed May 28, 1896. Serial No. 593,455. (No model.)

*To all whom it may concern:*

Be it known that I, WILLIAM H. PORTER, a citizen of the United States, residing at New York, in the county of New York and State of New York, have invented certain new and useful Improvements in Catalytic Lighting of Illuminating-Gas, of which the following is a specification.

My invention relates to the catalytic lighting of illuminating-gas when turned on or otherwise allowed to flow from a gas burner or tip.

The object of my invention is to provide a substance which can be used at or near the opening of an ordinary gas-burner tip and which will by catalytic action ignite ordinary illuminating-gas and which substance will retain its power to ignite gas at any time at ordinary temperatures and in atmospheric air.

My invention consists in a substance having these qualities, as more particularly pointed out hereinafter.

In the accompanying drawings, forming part of the specification, I have illustrated an embodiment of my invention, in which—

Figure 1:
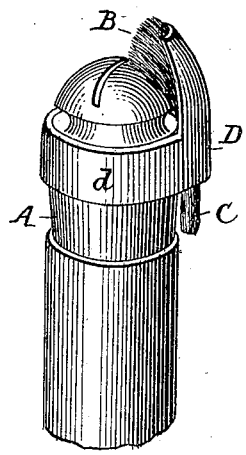
Figure 2:
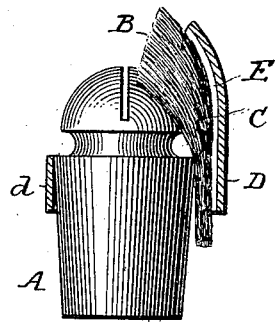
Figure 3:
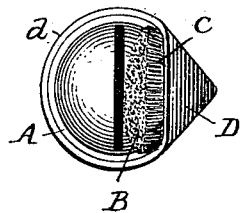

Figure 1 is an elevation of a gas-tip having the catalytic substance applied thereto. Fig. 2 is a section thereof, and Fig. 3 is a top plan view of the same.

In order to carry out my invention, in the present instance I make a coherent mass, as distinguished from powder or a collection of loose granules, of two or more ingredients, which mass on being exposed to ordinary illuminating-gas in atmospheric air will become catalytically heated to a point of incandescence, so that the gas will thereby be ignited, and the mass will retain this power for repeated and indefinite use.

In the particular embodiment of my invention herein set forth and claimed the substance used for igniting the gas by its own action in the manner set forth consists, essentially, of a coherent mass of porous material of exceedingly fine porosity having in its pores platinum in the state of platinum-black or equivalent material, whereby the latter is held in so finely-divided a condition that its particles are prevented from coalescing. In order to provide such substance, I use as one of the ingredients one or more catalytic metals—such as platinum, palladium, &c.—and another ingredient in the form of a salt or salts of certain infusible oxids, such as zirconium, aluminium, &c. This may be conveniently used in connection with asbestos or other fibrous or solid material, which will form a base or support for it and hold it in position with relation to the gas-tip.

In one particular embodiment of my invention I use platinum in the form of platinum-black, mixed with the oxid of zirconium in about the proportion of twenty-five per cent. of platinum to seventy-five per cent. of zirconium oxid. To prepare this, the platinum in a state of solution is mixed with the oxid of zirconium and the liquid is evaporated, leaving the platinum distributed throughout the mass. This is then preferably applied to some incombustible substance, such as asbestos or mineral wool, which forms a convenient holder or support for the substance. The substance after it has been heated by lighting the gas passing through the tip on which it is applied consists of a mixture of zirconium oxid and platinum-black, in which the latter is in so finely-divided a condition that its particles are prevented from coalescing.

In using the substance in connection with a burner or tip I preferably provide a shield for it, and this shield may be so arranged as to provide air-passages around or about the substance.

Thus in the drawings A represents any burner or tip through which gas passes, and B the substance for catalytically lighting the gas. This is usually attached to a base or support C, of non-combustible material, and is protected by a shield D. In the present instance the shield D has a band $d$ surrounding the burner, and the shield extends upward and partially around the tip, while it is arranged so as to furnish an air-passage E between the support and shield.

What I claim herein as my invention is—

1. A substance for igniting gas by its own action in the manner set forth consisting of a coherent mass of porous material of exceedingly fine porosity having in its pores platinum in the state of platinum-black, whereby the latter is held in so finely-divided a condition that its particles are prevented from coalescing, substantially as described.

2. A catalytic substance consisting of platinum in the form of platinum-black and zirconium oxid, substantially as described.

In testimony whereof I have signed my name to this specification in the presence of two subscribing witnesses.

WILLIAM H. PORTER.

Witnesses:
 ABNER MCKINLEY,
 EDWARD R. MEEK.